United States Patent
Bambagioni et al.

(10) Patent No.: US 11,926,468 B2
(45) Date of Patent: Mar. 12, 2024

(54) CAPSULE AND SYSTEM FOR PREPARING A BEVERAGE FROM SUCH CAPSULE WITH A SEAL MEMBER

(71) Applicant: SOCIETE DES PRODUITS NESTLE S.A., Vevey (CH)

(72) Inventors: Guido Bambagioni, Perugia (IT); Gilles Gavillet, Ursy (CH); Alexandre Kollep, Lutry (CH); Frederic Doleac, Vaux et Chantegrue (FR)

(73) Assignee: Societe des Produits Nestle S.A., Vevey (CH)

( * ) Notice: Subject to any disclaimer, the term of this patent is extended or adjusted under 35 U.S.C. 154(b) by 827 days.

(21) Appl. No.: 16/624,369

(22) PCT Filed: Jun. 18, 2018

(86) PCT No.: PCT/EP2018/066041
§ 371 (c)(1),
(2) Date: Dec. 19, 2019

(87) PCT Pub. No.: WO2019/001995
PCT Pub. Date: Jan. 3, 2019

(65) Prior Publication Data
US 2020/0391935 A1    Dec. 17, 2020

(30) Foreign Application Priority Data
Jun. 26, 2017 (EP) .................... 17177820

(51) Int. Cl.
*B65D 85/804* (2006.01)
*B65D 53/06* (2006.01)
(Continued)

(52) U.S. Cl.
CPC ......... *B65D 85/8064* (2020.05); *B65D 53/06* (2013.01); *B65D 85/8046* (2013.01);
(Continued)

(58) Field of Classification Search
CPC ....................................... B65D 85/804–8067
See application file for complete search history.

(56) References Cited

U.S. PATENT DOCUMENTS

2011/0200725 A1    8/2011   Kollep et al.
2012/0251694 A1*  10/2012   Kamerbeek ........... A47J 31/368
                                                          426/433
(Continued)

FOREIGN PATENT DOCUMENTS

WO    2006045536    5/2006
WO    2010006936    1/2010
(Continued)

*Primary Examiner* — Drew E Becker
*Assistant Examiner* — Chaim A Smith
(74) *Attorney, Agent, or Firm* — K&L Gates LLP (57) ABSTRACT

The invention relates to a capsule (2) for the preparation of a beverage by extracting the substance in a beverage preparation device, comprising: —an aluminium capsule body (3) with a bottom, a side wall (6) and an outwardly extending flange (7), —a cover (8) attached to the outwardly extending flange (7) and, —a sealing member (9) at the outwardly extending flange (7) for providing a water sealing contact with an enclosing member of the beverage preparation device; wherein the sealing member (9) comprises at least one annular layer of polymeric material positioned on the outwardly extending flange wherein in use in the device, the sealing member is compressed and wherein the outwardly extending flange (7) comprises an annular recess (16) with an annular bottom wall (17), and an inner projecting wall (18) and an outer projecting wall (19), both projecting walls (18, 19) extending in a direction towards the bottom of the capsule body and wherein the annular layer of polymeric material (20) is entirely contained in the annular recess (16).

14 Claims, 6 Drawing Sheets

(51) Int. Cl.
   *F16J 15/10* (2006.01)
   *A47J 31/36* (2006.01)
   *A47J 31/40* (2006.01)

(52) U.S. Cl.
   CPC ..... *B65D 85/8049* (2020.05); *B65D 85/8052* (2020.05); *F16J 15/102* (2013.01); *A47J 31/3628* (2013.01); *A47J 31/407* (2013.01)

(56) References Cited

U.S. PATENT DOCUMENTS

| | | |
|---|---|---|
| 2014/0234494 A1 | 8/2014 | Doglioni Majer |
| 2016/0066591 A1* | 3/2016 | Halliday ............... A47J 31/369 426/115 |

FOREIGN PATENT DOCUMENTS

| | | |
|---|---|---|
| WO | 2014184653 | 11/2014 |
| WO | 2015000775 | 1/2015 |
| WO | 2016030887 | 3/2016 |
| WO | 2016174671 | 11/2016 |
| WO | 2016186496 A1 | 11/2016 |

* cited by examiner

CAPSULE AND SYSTEM FOR PREPARING A BEVERAGE FROM SUCH CAPSULE WITH A SEAL MEMBER

CROSS REFERENCE TO RELATED APPLICATIONS

The present application is a National Stage of International Application No. PCT/EP2018/066041, filed on Jun. 18, 2018, which claims priority to European Patent Application No. 17177820.2, filed on Jun. 26, 2017, the entire contents of which are being incorporated herein by reference.

The invention relates to a capsule containing a substance for the preparation of a beverage by extracting the substance by means of supplying a water under pressure into the capsule.

The invention also relates to a system for preparing a beverage from a capsule using a water supplied under pressure into the capsule comprising: a beverage preparation device comprising an enclosing member for receiving the capsule and capsule.

Such a capsule, system are known from EP1654966B1, EP2151313B1 and EP2318199B1.

In the known system the capsule is provided with a sealing member with rubber-elastic means at a transition between a side wall of a body portion and rim portion extending therefrom. The sealing member forms a continuous portion which is distributed about the circumferential transition from the rim to the side wall of the capsule. The outer surface of the cured sealing means is linear or meniscus-like when seen in a cross-sectional view and the thickness of the sealing member continuously decrease towards the end at the side wall of the base body portion and the end at the rim portion respectively.

Furthermore in the known system the device comprises an enclosing member (also called "capsule cage") and a closing member (also called "capsule holder") and a manually operated or an automatic mechanism for the relative displacement of the enclosing member and the closing member. The manually operated or an automatic mechanism applies a force on the sealing member of the capsule when the enclosing member closes on the closing member. This force should ensure the liquid-tight seal between the enclosing member and the capsule so that no water bypass and essentially all water is passed through the capsule. Because the manually operated or an automatic mechanism is arranged to be moved relative to the base, the sealing capabilities of the system can depend on the pressure of the water injected by the water injection means. If the pressure of the water increases, the force between the sealing member of the capsule and the free end of the enclosing member increases too and thereby the force between the sealing member of the capsule and the free end of the enclosing member increases also. Therefore, the sealing member of the capsule must be arranged such that upon reaching the maximum water pressure, the sealing member should still provide a liquid-tight sealing contact between the enclosing member and the capsule.

However, the sealing member must also be arranged such that prior to, or at the start of, brewing when the pressure of water in the enclosing member outside the capsule is relatively low, the sealing member also provides a water sealing contact between the enclosing member and the capsule. If at the start of brewing, there would not exist a water sealing contact between the capsule and the enclosing member, leakage will occur. However, if leakage occurs, the pressure in the enclosing member and outside the capsule might not sufficiently increase for increasing the force on the sealing member by means of the free end of the enclosing member if the manually operated or an automatic mechanism moves the enclosing member towards the closing member (capsule holder). Only if there is a sufficient initial sealing, the pressure in the enclosing member will increase whereby also the force of the free end of the enclosing member acting on the sealing member of the capsule will increase for providing a sufficient water sealing contact. Moreover, this increased water pressure outside the capsule also provides an increased water pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design. It should be able to provide a water sealing contact between the enclosing member and the capsule at a relatively low fluid pressure if only a relatively small force is applied on the sealing member by means of the free end of the enclosing member but it should also provide a water sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

It is an object of the invention to provide an alternative capsule with a sealing member which provides a satisfactory liquid-tight sealing with the seal member both at a relatively low water pressure if only a relatively small force is applied on the sealing member by means of the free end of the enclosing member (sometimes also called initial seal) and at a much higher water pressure if a higher force is applied (e.g. during brewing) by means of the free end of the enclosing member to the sealing member of the capsule, even in case of an enclosing member of which the free contact end is provided with radially extending open grooves. It is also an object to provide a more cost effective solution compared to the one of EP2151313B1 and EP2318199B1 while it maintains a sufficient surface necessary to attach the cover of the capsule to the body.

SUMMARY OF THE INVENTION

In accordance with the invention there is provided in a first aspect a capsule containing a substance for the preparation of a beverage by extracting the substance by means of supplying water under pressure in the capsule in a beverage preparation device, wherein the capsule comprises:
- an aluminium capsule body having a central capsule body axis, the capsule body being provided with a bottom, a side wall and an outwardly extending flange and,
- a cover attached to the outwardly extending flange, the cover closing the capsule,
- wherein the capsule comprises a sealing member at the outwardly extending flange for providing a water sealing contact with an enclosing member of the beverage preparation device when the capsule is positioned in the enclosing member of the beverage preparation device and the enclosing member is closed by means of a closing member of the beverage preparation device, such as an extraction plate of the device, such that the outwardly extending flange of the capsule and at least a portion of the sealing member of the capsule are sealingly engaged between the enclosing member and the closing member of the device, wherein the enclosing member of the beverage preparation device comprises an annular element having an annular element axis with a free contact end, wherein the sealing member comprises an annular layer of polymeric material positioned on the outwardly extending flange wherein in use upon closing of the enclosing member the sealing member is compressed by the free contact end of the annular element being moved towards the closing element, wherein the outwardly extending flange comprises a annular outer wall, optionally a curled outer edge extending from the annular outer wall, and an annular recess between the annular outer wall and the side wall; said annular recess comprising an annular bottom wall, and an inner projecting wall and an outer projecting wall, both projecting walls extending in a direction towards the bottom of the capsule body, and wherein the annular layer of polymeric material is contained in the annular recess and does not extend on the annular outer wall.

The annular outer wall preferably extends outwardly in a direction substantially transversal to the body axis of the body of the capsule. The inner projecting wall and outer projecting wall of the annular recess extend in a direction closer (less angled) to a direction parallel to the body axis than the direction the annular outer wall extends to. As a result, the annular outer wall forms a proper surface for the sealing of the cover, whereas the inner projecting walls form proper surfaces for delimiting the sealing member and reducing the quantity of polymeric material.

Therefore, the location of the polymeric material is better controlled to ensure the water tightness precisely where this is needed. By controlling deformation of the polymeric material in the annular recess, the water tightness can be performed even at a relatively low water pressure. The amount of polymeric material required is also reduced while the surface for attachment of the cover of the capsule to the outwardly extending flange remains sufficient. Preferably, the distance between the inner projecting wall and the outer projecting wall is such that the free contact end of the annular element is positioned between the two walls.

Therefore, the compressive deformation of the projecting walls is advantageously prevented and the compressive deformation is only applied onto the sealing member in the annular recess. Therefore, the projection prevents the sealing member from deforming outwardly and maintain it with sufficient rigidity. As a result, deformation of the sealing member is controlled and satisfactory seal can be obtained with very small amount of sealing polymeric material.

Preferably, the capsule comprises an outer projection extending towards the bottom of the body from the outwardly extending flange and comprising the outer projecting wall. Furthermore, the outer projection has an annular cavity extending on the side of the outwardly extending flange directed towards the cover thereby comprising the outer projecting wall of the recess, a top wall or line and a second outer projecting wall directed towards the bottom of the body.

With such hollow structure, the projection is sufficiently rigid to control deformation of the sealing member in the annular recess both a relatively low fluid pressure during closing of the closing member and at high pressure during brewing. The projection can also advantageously be formed in the aluminium body of the capsule.

In a mode, the inner projecting wall of the annular recess is formed as part of side wall of the body. This provides an advantageously simplified arrangement of the body of the capsule.

In another mode, the capsule comprises a second projection extending towards the bottom of the body from the outwardly extending flange. Furthermore, the second projection has an annular cavity extending on the side of the outwardly extending flange directed towards the cover thereby comprising the inner projecting wall of the recess, a top wall or line and a second inner projecting wall directed towards the bottom of the body.

Preferably, the largest width of the annular recess is at least twice smaller than the width (D) of the outwardly extending flange. In particular, the largest width of the annular recess is preferably lower than 1.9 mm, more preferably is comprised between 1.0 and 1.5 mm. The maximum amount of polymer material is also preferably lower than 40 mg, more preferably is comprised between 20 and 35 mg, most preferably 22-28 mg.

Furthermore, the first and/or second projections have preferably a height between 0.1 and 1.5 mm, preferably between 0.5 and 1.0 mm, relative to the annular bottom wall of the annular recess. It is important to adapt the height of the projections to the thickness of the layer of polymeric material so that the full material is contained in the annular recess and does not extend beyond or overflow.

The first and/or second projections are/is preferably obtained by embossing or deep drawing. The outer projecting wall outwardly delimiting the annular recess has preferably a diameter, at its base, larger than 31.7 mm, more preferably comprised between 31.8 mm and 32.0 mm. The inner projecting wall inwardly delimiting the annular recess has preferably a diameter, at its base smaller than 29.9 mm, more preferably between 29.85 and 29.70.

According to an aspect, the cover is attached to the annular outer wall and/or to the annular bottom wall of the annular recess.

Therefore, the surface of attachment of the cover to the body of the capsule remains sufficient to create a strong bond that withstands internal pressures in the capsule.

In one aspect, the inner projecting wall and/or outer projecting wall of the annular recess are distanced such that in use upon closing of the enclosing member, the sealing member is compressed by the free contact end of the annular element and polymeric material of the sealing member flows between the inner and/or outer projecting walls upon compressive forces of the free contact end such that to exert an axial and radial force on the free contact end of the annular element when the capsule is positioned in the enclosing member of the beverage preparation device and the enclosing member is closed by means of the closing member of the beverage preparation device.

Therefore, upon closing, already both an axial effort and a radial effort of the sealing member exert on the annular element thereby providing an effective seal able to 'close' the radially extending open grooves of the annular element.

In a possible aspect, the inner projecting wall and/or outer projecting wall of the annular recess is inclined relative to the annular bottom wall of the annular recess an angle between 45 and 85 degrees.

Such angled configuration may improve the distribution of the sealing material in the recess but also reduce the overall amount necessary for an equivalent sealing effect.

The polymer material of the sealing member may be a compressible polymeric material. It may be applied in viscous or liquid form and be hardened once applied in the recess. The polymer material is food grade rubber, thermoplastic elastomer (TPE) or a, preferably soft, polymer or copolymer. Soft polymers or copolymers have generally a hardness at ambient temperature (20° C.) lower than or equal to 50 Shore A. In particular, the polymer material may be selected amongst the group consisting of: silicone rubber, EPDM, polyurethane, styrene TPE (e.g., styrene-block copolymer), polyester TPE (e.g. ether-ester block copolymer), polyamide TPE (e.g. ether amide bloc copolymer), polyolefin (e.g. polyethylene, polypropylene) and combinations thereof.

The invention is in particular suitable when applied to an embodiment of a beverage preparation system according to the invention. The invention may so be a system for preparing a beverage from a capsule using water under pressure into the capsule comprising:

a beverage preparation device comprising an enclosing member for receiving the capsule, wherein the enclosing member comprises water injection means for supplying water under pressure into the capsule, a closing member such as an extraction plate for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves;

and a capsule according to as aforementioned and, wherein the free contact end of the annular element is arranged for compressing the layer of polymeric material in the annular recess when the enclosing member is closed by means of the closing member.

In the system of the invention, the capsule is arranged such that the distance between the inner and outer projecting walls of the annular recess is such that the free contact end of the annular element enters the annular recess between the inner and outer projecting walls. Furthermore, the free contact end of the annular element enters the annular recess such that polymeric material flows between the inner and/or outer projecting walls upon compressive forces of the free contact end such that to exert an axial and radial force on the free contact end of the annular element when the capsule is positioned in the enclosing member of the beverage preparation device and the enclosing member is closed by means of the closing member of the beverage preparation device.

The invention may also be summarized as being for a capsule for the preparation of a beverage by extracting the substance in a beverage preparation device, comprising:

an aluminium capsule body with a bottom, a side wall and an outwardly extending flange, a cover attached to the outwardly extending flange and, a sealing member at the outwardly extending flange for providing a water sealing contact with an enclosing member of the beverage preparation device; wherein the sealing member comprises at least one annular layer of polymeric material positioned on the outwardly extending flange wherein in use in the device, the sealing member is compressed and wherein the outwardly extending flange comprises an annular recess with an annular bottom wall, and an inner projecting wall and an outer projecting wall, both projecting walls extending in a direction towards the bottom of the capsule body and wherein the annular layer of polymeric material is entirely contained in the annular recess and the largest width of the annular recess is at least twice smaller than the width (D) of the outwardly extending flange.

BRIEF DESCRIPTION OF THE DRAWINGS

The invention will now be further elucidated by means of, non-limiting, examples referring to the drawing, in which.

DETAILED DESCRIPTION OF THE DRAWINGS

Figure 1:
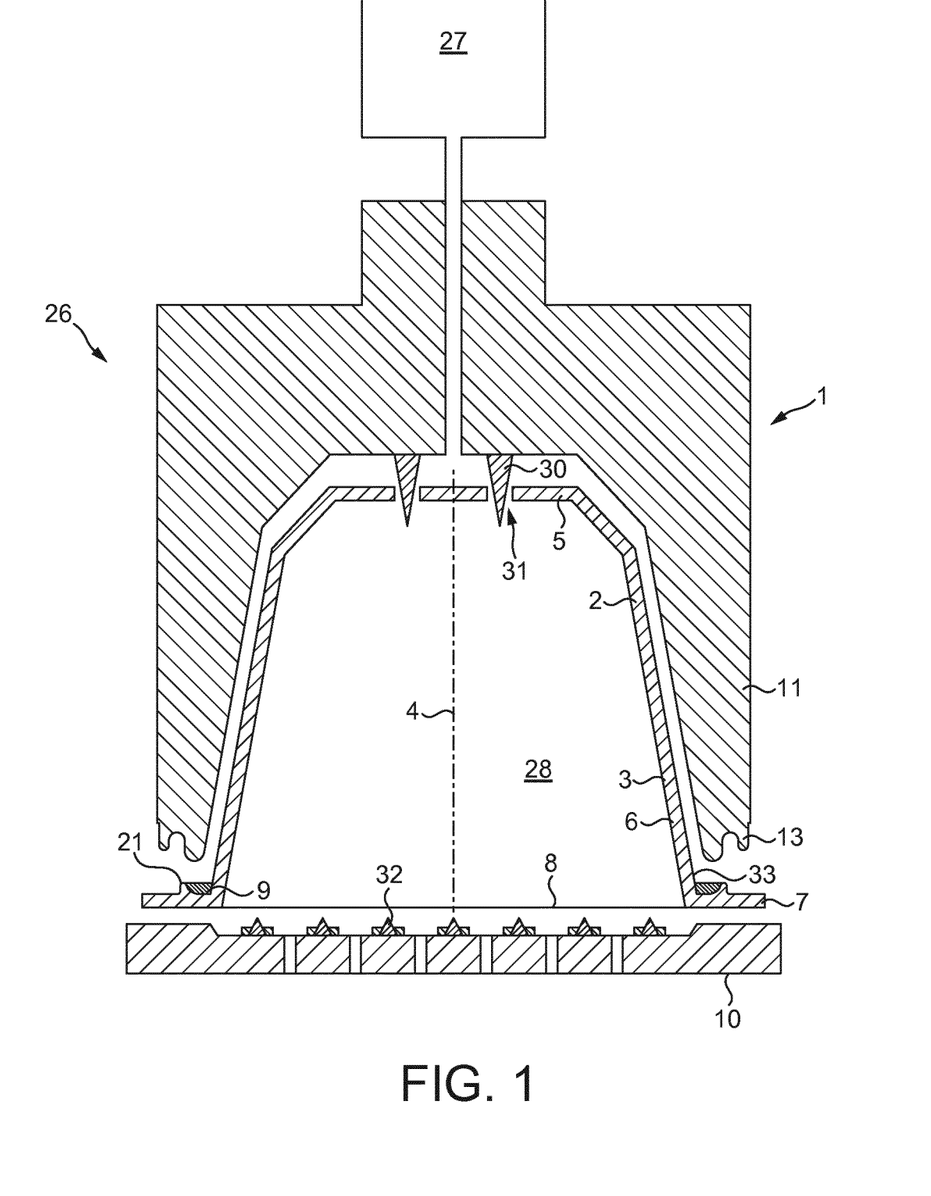
FIG. 1 shows a schematic representation of an embodiment of a system according to the invention.

FIG. 1 shows a schematic representation, in cross sectional view, of an embodiment of a system for preparing a potable beverage from a capsule using a fluid supplied under pressure into the capsule. The system 1 comprises a capsule 2, and a beverage preparation device 1. The device 1 comprises enclosing member 26 for holding the capsule 2. The device 1 further comprises a closing member 10, such as an extraction plate, for supporting the capsule 2.

In FIG. 1 a gap is drawn between the capsule 2, the enclosing member 26 and the extraction plate 10 for clarity. It will be appreciated that, in use, the capsule 2 may lie in contact with the enclosing member 26 and the extraction plate member 10. Commonly, the enclosing member 26 has a shape complementary to the shape of the capsule 2. The device further comprises water injection means 27 for supplying an amount of water, under a pressure in the range of 6-20 bar, preferably between 10 and 18 bar, to the exchangeable capsule 2.

In the example shown in FIG. 1, the exchangeable capsule 2 comprises an aluminum capsule body 3 having a central capsule body axis 4 and an aluminum cover 8. In the present context, the meaning of 'aluminum' is understood to also include aluminum alloy. In this example, the aluminum capsule body 3 comprises a side wall 6, a bottom 5 closing the side wall at a first end, and a outwardly extending flange 7 extending outwardly of the side wall 6 at a second end opposite the bottom 5. The side wall 6, the bottom 5 and the cover 8 enclose an inner space 28 comprising a substance for the preparation of a beverage by extracting and/or dissolving the substance. Preferably the substance is 5-20 grams, preferably 5-10 grams, more preferably 5-7 grams of roasted and ground coffee for the preparation of a single beverage. The capsule is initially sealed, i.e. is hermetically closed prior to use.

The system 1 of FIG. 1 comprises bottom piercing members 30 for piercing or tearing the bottom 5 of the capsule 2 for creating at least one entrance opening 31 in the bottom for supplying the water to the extractable product through the entrance opening(s). The system 1 of FIG. 1 further comprises cover piercing members 32, here embodied as pyramid-type protrusions of the closing member 10, for piercing the cover 8 of the capsule 2. The cover piercing means 32 may be arranged to tear the cover once a (fluid) pressure inside the inner space 28 exceeds a threshold pressure and presses the cover against the cover piercing means with sufficient force. The cover may be aluminium and/or polymeric and be arranged to tear open on the closing member 10 of the beverage preparation device under the influence of fluid pressure (e.g. created by the pressurized combination of water, gas and solids) in the capsule.

The capsule 2 further comprises a sealing member 9 which is arranged at the outwardly extending flange 7 for providing a liquid sealing contact with the enclosing member 26 when the capsule is positioned in the enclosing member and the enclosing member is closed by means of the extraction plate or closing member 10, such that the outwardly extending flange of the capsule and at least a portion of the sealing member are sealingly engaged between the enclosing member and the extraction plate. This means that a liquid sealing contact between the sealing member and the free contact end is established.

Figure 2:
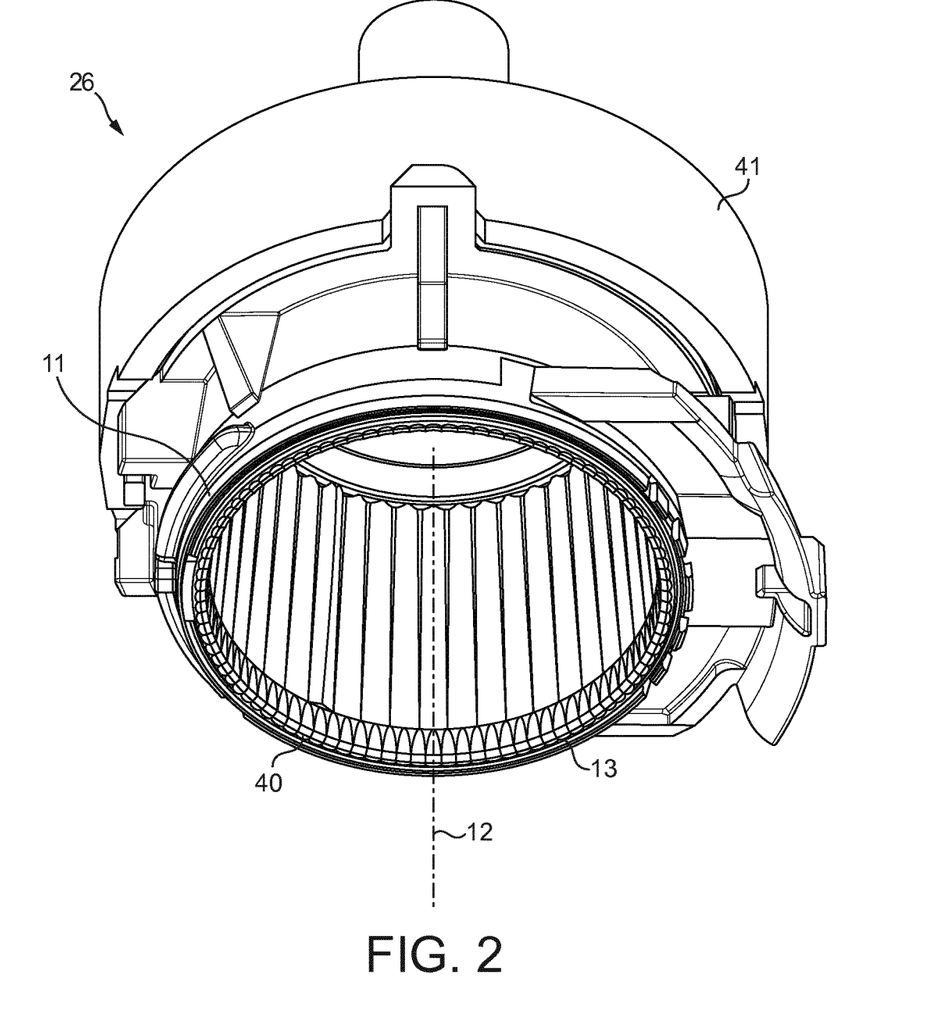
FIG. 2 in a perspective view shows an embodiment of a beverage preparation device of a system according to the invention showing the free contact end of the enclosing member of the beverage preparation device with the plurality of radially extending open grooves.

As shown in FIG. 2 the enclosing member 26 of the beverage preparation device comprises an annular element 11 having a central annular element axis 12 and a free contact end 13. The enclosing member 26 may be formed of several pieces including a separate annular element 11 joined to a base element 41 as illustrated in FIG. 2. Alternatively, the enclosing member 26 may be formed of a single piece including the annular element 11 integral to the rest of the member as illustrated in FIG. 1. The free contact end 13 of the annular element may be provided with a plurality of radially extending open grooves 40. The plurality of radially extending open grooves 40 are uniformly spaced relative to each other in tangential direction of the free contact end of the annular element 11. The longest tangential width of each groove is 0.9-1.1 mm, preferably 0.95 to 1.05 mm, wherein a maximal height of each groove in an axial direction of the enclosing member 26 is 0.01-0.09 mm, preferably 0.03 to 0.07 mm. The number of grooves 40 lies in the range of 90 to 110.

Usually, the radial width of the free end at the location of the grooves 40 is 0.05-0.9 mm, more specifically 0.2-0.7 mm, more specifically 0.3-0.55 mm.

Figure 5:
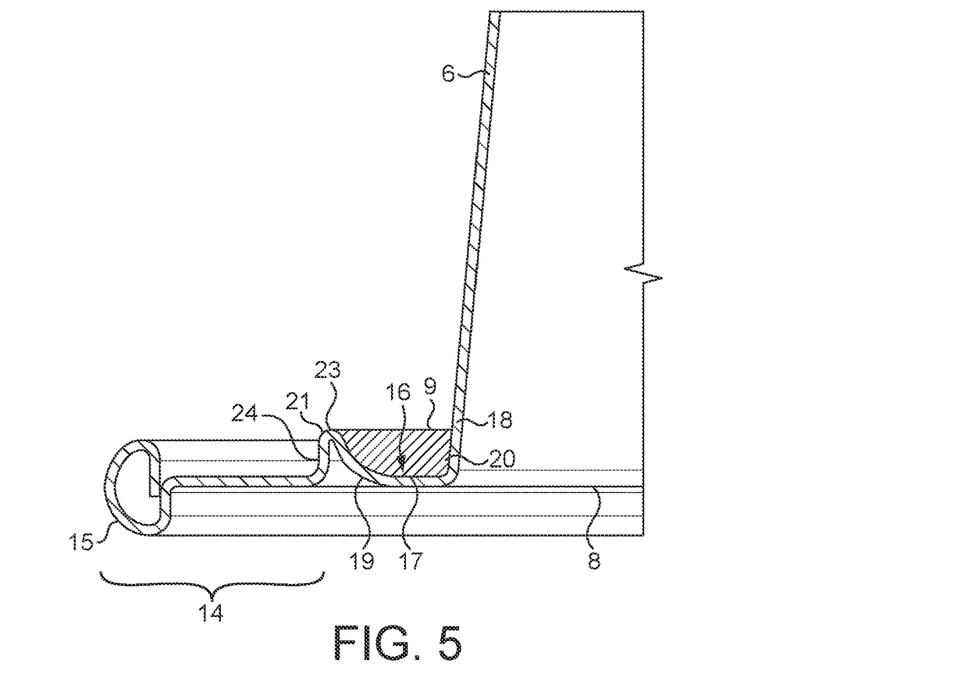
FIG. 5 in cross section shows an enlarged detail of a capsule of the invention according to a first mode showing the outwardly extending flange and the sealing member.
Figure 6:
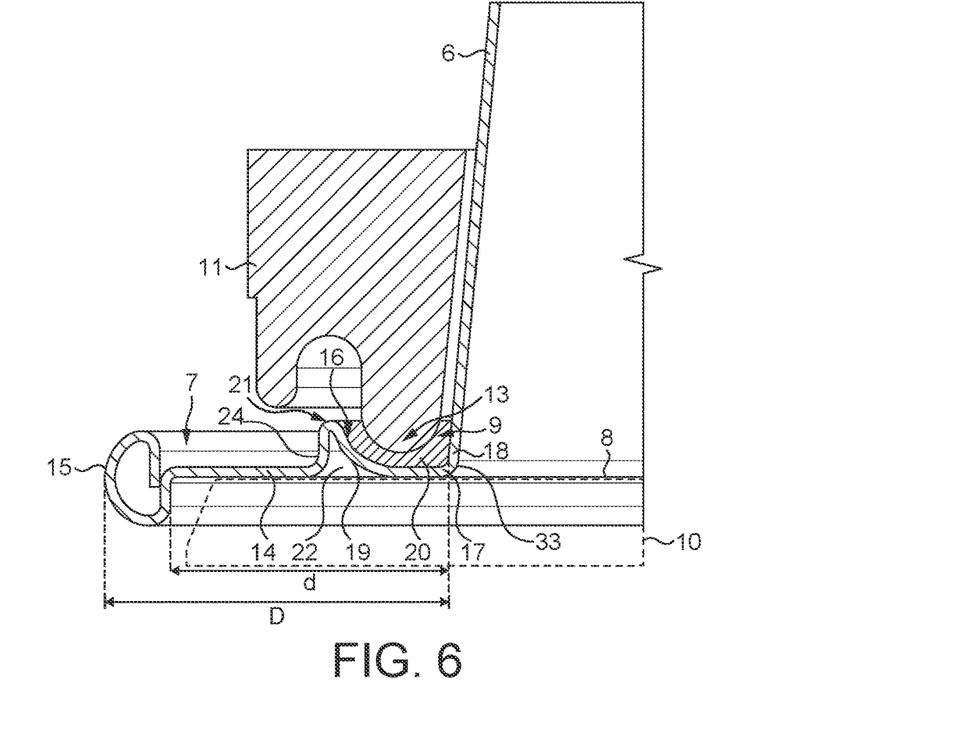
FIG. 6 shows an enlarged detail of the outwardly extending flange of the capsule of FIG. 5 when engaged by the annular element of the beverage preparation device.

An embodiment of a capsule according to the invention is shown more detailed in FIGS. 5 and 6. In the shown embodiment the outer diameter of the outwardly extending flange is larger than the diameter of the bottom 5 of the capsule. In the shown embodiment the outer diameter of the outwardly extending flange 7 is approximately 37.1 mm and the diameter of the bottom 5 is about 23.3 mm. The thickness of the aluminum capsule body 3 may be between 20 and 200 micrometer.

In the shown embodiment, the wall thickness of the cover 8, when made of aluminium, is about 40 micrometer. The wall thickness of the aluminum cover is preferably smaller than the thickness of the aluminum capsule body 3.

The side wall 6 of the capsule body 4 has a free end 33 opposite the bottom. The inner diameter of the free end 33 of the side wall of the aluminum capsule body is about 29.5 mm. The outwardly extending flange 7 extends from that free end 33 in a direction at least substantially transverse to the central capsule body axis 4. The outwardly extending flange 7 may comprise a curled outer edge 15. In the shown embodiment the curled outer edge 15 of the outwardly extending flange has a largest dimension of about 1.2 millimeter. The distance d between the free end 33 of the side wall 6 of the aluminum capsule body 3 and an inner edge of the curled outer edge 15 is about 2.7 mm, while the distance D between the free end 33 of the side wall of the aluminum capsule body and an outermost edge of the outwardly extending flange is about 3.9 millimeter. The largest width (radial distance) of the annular recess 16 is preferably smaller than twice the distance D. Therefore, the largest width of the annular recess can be lower than 1.9 mm, preferably between 1 and 1.5 mm. The diameter about the central capsule body axis of the inner edge of the curled outer edge 15 is preferably at least 34.7 mm.

Figure 3:
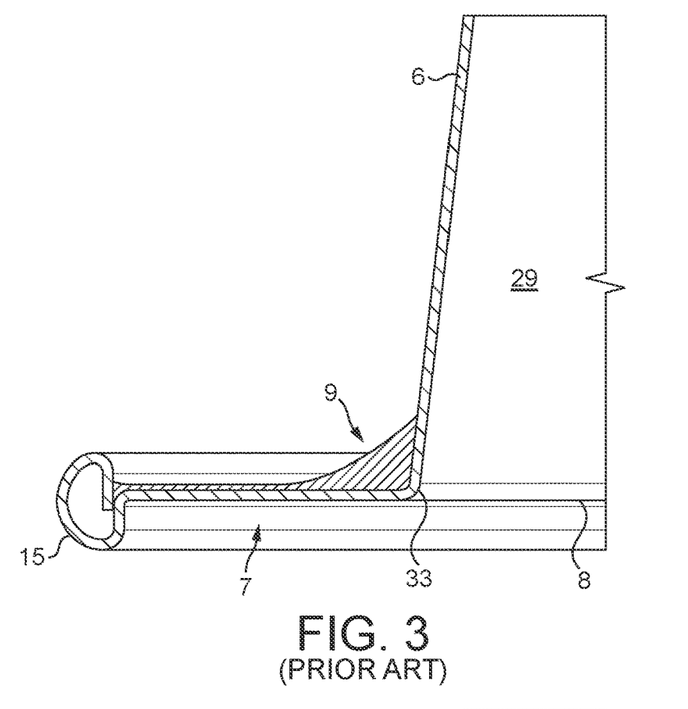
FIG. 3 in cross section shows an enlarged detail of a capsule of the prior art showing the outwardly extending flange and the sealing member.
Figure 4:
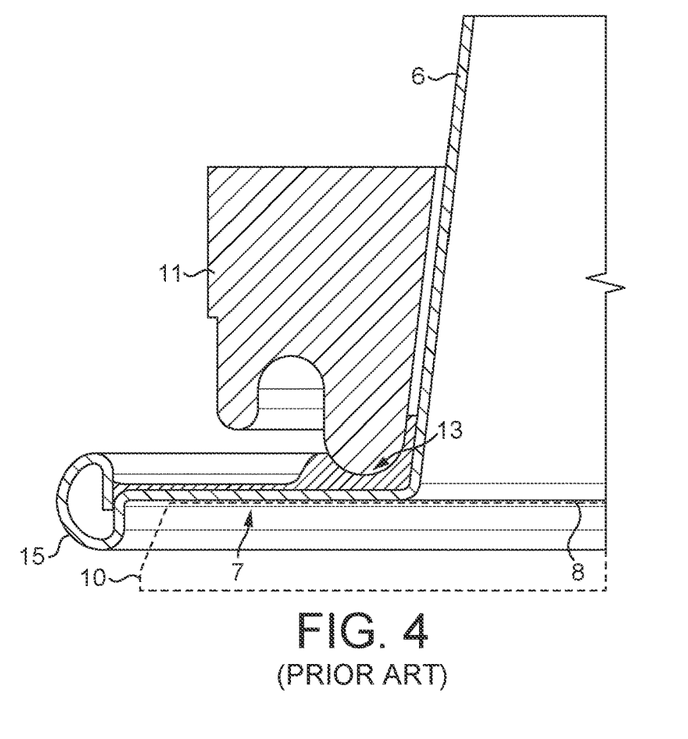
FIG. 4 shows an enlarged detail of the outwardly extending flange of the capsule of the prior art when engaged by the annular element of the beverage preparation device.

A capsule of the prior art is represented at FIGS. 3 and 4 and described, for instance in EP2151313B1 and EP2318199B1. Such capsule may be received in the beverage preparation device as represented in FIG. 1 in a liquid-tight manner. The capsule comprises a body 3 with a bottom 5, a side wall 6 and an outwardly extending flange 7. The capsule comprises a cover 8 which is attached to the outwardly extending flange 7 in the direction opposite to the bottom of the body. The annular attachment surface provided by the substantially flat outwardly extending flange is relatively large thereby providing a strong bond with little risk of delamination such as due to gas (e.g. carbonic and/or nitrogen) pressure when the capsule is closed before piercing or due to fluid pressure during brewing. The attachment is generally obtained by welding with suitable sealant layer(s) between the outwardly extending flange 7 and the cover 8.

For the liquid-tight sealing engagement with the device upon closing, the capsule comprises a sealing member 9 at the outwardly extending flange 7 for providing a water sealing contact with an enclosing member 26 of the beverage preparation device when the capsule is positioned in the enclosing member of the device and the enclosing member is closed by means of a closing member 10 such as the extraction plate. In such configuration illustrated in FIG. 4, the outwardly extending flange 7 and a part of the sealing member 9 are sealingly engaged between the enclosing member 26 and the closing member 10 of the device (closing member 10 in dotted lines). In particular, the free contact end 13 of the annular element 11 compresses the sealing member, especially, next to the free end of the side wall where the sealing member is thicker. The sealing member is resilient and forms a continuous portion which is distributed about the circumferential transition from the flange to the sidewall of the capsule. The outer surface of the sealing means is linear (slanted) or meniscus-like when seen in a cross-sectional view. The thickness of the sealing member continuously decreases towards the end at the side wall 6 from the free end 33. The thickness also decreases towards the curled outer end 15 at the outwardly extending flange 7. The sealing member is generally applied in viscous and liquid state onto the outwardly extending flange 7, heated thereby causing the migration of the sealing member over the surface of the flange and side wall and then it is cured. With such sealing member configuration, a significant amount of sealing material does not participate in the sealing engagement of the sealing member with the enclosing member 26. Indeed, the sealing contact between free contact end 13 and the sealing member 9 is focused in a smaller part of the outwardly extending flange 7 and in the transition area with the sidewall at the free end 33 of the side wall.

The capsule of the invention according to a first possible mode is illustrated in FIGS. 5 and 6. In this case, the sealing member 9 is contained in an annular recess 16 of the outwardly extending flange 7. The annular recess comprises an annular bottom wall 17, an outer projecting wall 19 and an inner projecting wall 18. The inner projecting wall 18 is part of the side wall 6 itself and extends from the free end 33 of the sidewall. The outer projecting wall 19 is part of an outer projection 21. The outer projection 21 extends towards the bottom 5 of the body of the capsule from the outwardly extending flange 7. It further comprises a top wall 23 and a second outer projecting wall 24. The projection has a cavity 22 extending on the side of the outwardly extending flange 7 directed to the cover 8. The cavity may be hollow but could be as well filled or plain. The annular recess 16 forms a part only of the outwardly extending flange 7 which further outwardly extends by an annular outer wall 14. The cover 8 is preferably attached, such as by welding, to the annular outer wall 14. The cover 8 may also advantageously be attached, such as by welding, to the bottom wall of the recess. The annular outer wall is therefore preferably flat to provide a proper attachment surface to the cover. As "flat" it is the surface is not incurved (convex or concave) in the transversal direction but the surface can be structured such as with striations or small imperfections of surface. The outwardly extending flange 7 may comprise a curled outer edge 15. Such edge generally provides a clean (non-cutting) edge of the aluminium body after the deep drawing operation.

The recess may be relatively shallow to contain at least one layer of polymeric material. The depth of the recess can be defined by the height of the outer projection 21. The height can, for instance be comprised between 0.1 and 1.2 mm, preferably between 0.2 and 0.8 mm. The bottom wall and/or projecting walls of the recess may not be necessary smooth and may comprise small striations or a wavy structure. The annular recess may further include an insert such as grid or small pieces such as microbeads or a filler embedded in the polymeric sealing material.

The weight of the polymeric material for the sealing member is between 20 and 30 mg, preferably about 25 mg. This represents a saving of about 50% compared to the sealing member of prior art EP2151313B1.

As it is shown in FIG. 6, the free contact end 13 of the annular element 11 is arranged for engaging the layer of polymeric material in the annular recess 16 by compression. The inner projecting wall 18 and the outer projecting wall 19 are arranged at a distance such that the free contact end of the annular element 6 is positioned in the recess and between the two projecting walls at preferably adjacent or very short distance. The material of the sealing member may generally deform by flowing along the inner wall 18 and outer projecting wall 19 so that it covers a curved surface of the free contact end of the annular element. Both an axial and radial sealing components of force are exerted onto the sealing member. Also, both the inner and outer side of the free contact end are in contact with the sealing member thereby further improving the sealing engagement with a limited amount of material. If the polymeric sealing material is a soft foam, the sealing member may also simply reduce in volume when compressed and in such case may not flow much upwards along the projecting wall. In such case, the sealing engagement involves essentially an axial sealing force.

Figure 7:
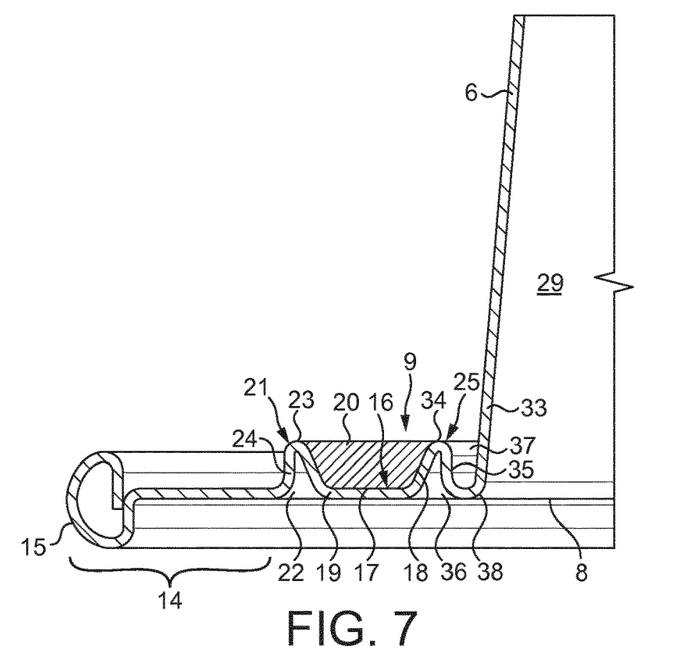
FIG. 7 in cross section shows an enlarged detail of a capsule of the invention according to a second mode showing the outwardly extending flange and the sealing member.
Figure 8:
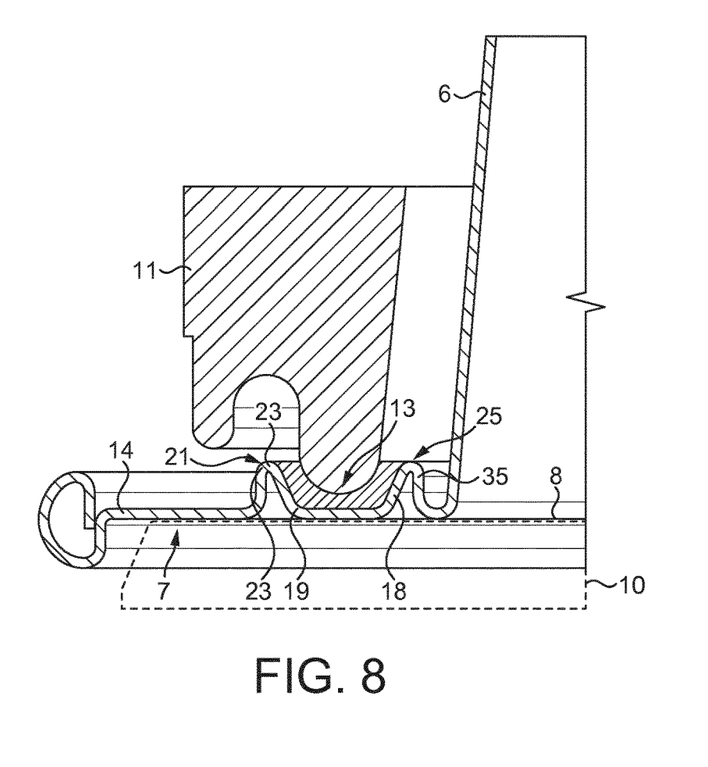
FIG. 8 shows an enlarged detail of the outwardly extending flange of the capsule of FIG. 7 when engaged by the annular element of the beverage preparation device.

The capsule of the invention according to a second possible mode is illustrated in FIGS. 7 and 8. In this case, the sealing member 9 is still contained in an annular recess 16 of the outwardly extending flange 7. The annular recess still comprises an annular bottom wall 17, an outer projecting wall 19 and an inner projecting wall 18. The outer projecting wall 19 is still part of an outer projection 21. One difference with the first mode is that the inner projecting wall 18 is part of an inner projection 25 which is slightly outwardly distant from the side wall 6. The projections 21 and 25 both extend towards the bottom 5 of the body of the capsule from the outwardly extending flange 7. The second projection 25 further comprises a top wall 34 and a second inner projecting wall 35. The second projection 25 has also a cavity 36 extending on the side of the outwardly extending flange 7 directed to the cover 8. The cavity may be hollow but could be as well filled or plain. The annular recess 37 forms a part only of the outwardly extending flange 7 which further outwardly extends by an annular outer wall 14. Between the inner projection 25 and the side wall 6, a second annular recess 37 is provided. Such recess may not be necessarily filled with polymeric sealing material but may preferably stay empty. The inner annular recess preferably extends towards to the cover by an annular bottom wall 38. The annular bottom walls 17, 38 are preferably outwardly aligned (i.e. without significant level change) with the annular outer wall 14. The cover 8 is preferably attached, such as by welding, to the annular outer wall 14. The cover 8 may advantageously be attached, such as by welding, to the annular bottom wall 17 of the annular recess 16 for the sealing member and/or to the annular bottom wall 38 of the inner recess 37.

The two projections 21, 25 are preferably obtained by embossing during the forming process of the body.

As for the previous mode, the recess may be relatively shallow to contain at least one layer of polymeric material. The depth of the recess can be defined by the height of the outer projection 21. The height can, for instance be comprised between 0.1 and 1.2 mm, preferably between 0.2 and 0.8 mm. The bottom wall 17 and/or projecting walls 19 of the recess may not be necessary smooth and may comprise small striations or a wavy structure. The annular recess may further include an insert such as grid or small pieces such as microbeads or a filler embedded in the polymeric sealing material.

As it is shown in FIG. 8, the free contact end 13 of the annular element 11 is also arranged for engaging the layer of polymeric material in the annular recess 16 by compression. The inner projecting wall 18 and the outer projecting wall 19 are arranged at a distance such that the free contact end 13 of the annular element 11 is positioned in the recess and between the two projecting walls at preferably adjacent or at very short distance. The material of the sealing member may generally deform by flowing along the inner wall 18 and outer projecting wall 19 so that it covers a curved surface of the free contact end of the annular element. Both an axial and radial sealing components of force are exerted onto the sealing member. Also, both the inner and outer side of the free contact end are in contact with the sealing member thereby further improving the sealing engagement with a limited amount of material. If the polymeric sealing material is a soft foam, the sealing member may also simply reduce in volume and in such case may not flow much upwards along the projecting wall. In such case, the sealing engagement involves essentially an axial sealing force.

Figure 9:
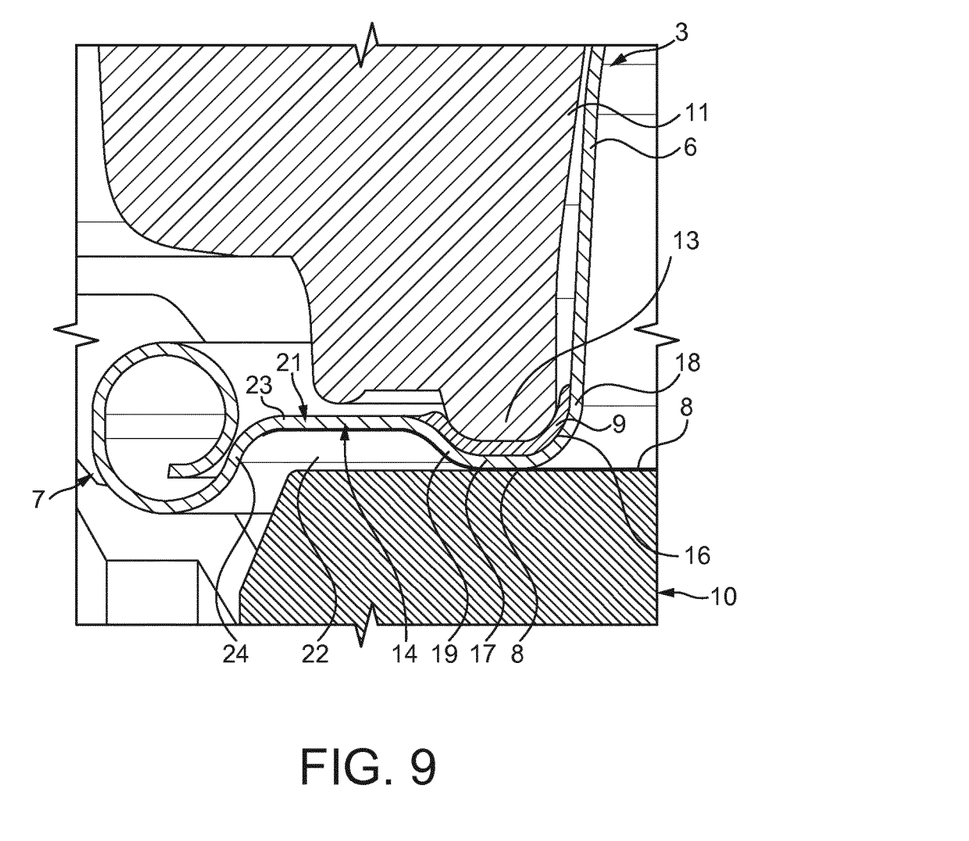
FIG. 9 shows an enlarged detail of the outwardly extending flange of the capsule according to another embodiment when engaged by the annular element of the beverage preparation device.

FIG. 9 shows another embodiment of the capsule of the invention. In this embodiment, the sealing member 9 is contained in an annular recess 16 of the outwardly extending flange 7. The annular recess comprises an annular bottom wall 17, an inner projecting wall 18 and outwardly projecting wall 19. The inner projecting wall 18 is part of the side wall 6 itself. The outer projecting wall 19 is part of an outer projection 21. The projection 21 extends towards the bottom 5 of the body of the capsule. It comprises a top wall 23 forming a plateau. The plateau can be flat. Such top wall or plateau 23 is delimited by the outer projecting wall 19 bordering the recess and by a second outer projecting wall 24 on the outer edge 15 of the outwardly extending flange. The outer edge may be curled and be directly connected to the outer projecting wall 24. The outer projection 21 has a cavity 22 extending on the side of the outwardly extending flange 7 directed towards the cover 8. Contrary to the embodiment of FIGS. 5 and 6, the outer projection 21 occupies a majority of the width of the annular outer wall 14. The outer projection 21 is larger than the annular recess 16.

The advantage of the embodiment of the capsule of FIG. 9 is that the forming of the recess and outer projecting wall 19 is facilitated and less prone to provide defects such as folds or crevices.

After forming and filling the recess with polymeric material, it is possible to deform the outer projecting wall, such as by a press. The outer projecting wall can be flattened until the outer projecting walls 19, 24 become substantially transversally aligned with the bottom wall 17 and with the projection 21 respectively. The advantage of flattening the outer projection 21 is essentially that a relatively large and flat annular aluminium surface is restored for enabling the sealing of the cover thereon.

The invention claimed is:

1. A capsule containing a substance for the preparation of a beverage by extracting the substance by supplying water under pressure in the capsule in a beverage preparation device, the capsule comprising:
an aluminium capsule body having a central capsule body axis, the aluminium capsule body being provided with a bottom, a side wall, and an outwardly extending flange;
a cover attached to the outwardly extending flange, the cover closing the capsule;
a sealing member at the outwardly extending flange configured for providing a water sealing contact with an enclosing member of the beverage preparation device when the capsule is positioned in the enclosing member of the beverage preparation device and the enclosing member is closed by a closing member of the beverage preparation device, such that the outwardly extending flange of the capsule and at least a portion of the sealing member of the capsule are configured to be sealingly engaged between the enclosing member and the closing member of the beverage preparation device, wherein the enclosing member of the beverage preparation device comprises an annular element having an annular element axis with a free contact end;
the sealing member comprises polymeric material positioned on the outwardly extending flange, wherein the enclosing member is configured such that the enclosing member being closed moves the annular element towards the closing element for the free contact end of the annular element to compress the sealing member; and
the outwardly extending flange comprises an annular outer wall and an annular recess between the annular outer wall and the side wall, the annular recess comprising an annular bottom wall, an inner projecting wall, and an outer projecting wall, the inner projecting wall and the outer projecting wall extending in a direction towards a bottom of the aluminium capsule body, and the annular recess is filled with the polymeric material and does not extend on the annular outer wall.

2. The capsule according to claim 1, wherein a distance between the inner projecting wall and the outer projecting wall is such that the free contact end of the annular element is positioned between the inner projecting wall and the outer projecting wall.

3. The capsule according to claim 1, comprising an outer projection extending towards the bottom of the aluminium capsule body from the outwardly extending flange and comprising the outer projecting wall.

4. The capsule according to claim 3, wherein the outer projection has an annular cavity extending on a side of the outwardly extending flange directed towards the cover, the outer projection comprising the outer projecting wall of the annular recess, a top wall or line, and a second outer projecting wall directed towards the bottom of the aluminium capsule body.

5. The capsule according to claim 3, wherein the inner projecting wall of the annular recess is part of the side wall of the aluminium capsule body.

6. Capsule according to claim 3, wherein it comprises a second projection extending towards the bottom of the body from the outwardly extending flange.

7. Capsule according to claim 6, wherein the second projection has an annular cavity extending on the side of the outwardly extending flange directed towards the cover thereby comprising the inner projecting wall of the recess, a top wall or line and a second inner projecting wall directed towards the bottom of the body.

8. The capsule according to claim 3, wherein the inner projection and/or the outer projection have a height between 0.1 and 1.5 mm relative to the annular bottom wall of the annular recess.

9. The capsule according to claim 1, wherein the cover is attached to the annular outer wall and/or to the annular bottom wall of the annular recess.

10. The capsule according to claim 1, wherein the inner projecting wall and/or the outer projecting wall of the annular recess are distanced such that the enclosing member is configured such that the enclosing member being closed compresses the sealing member by the free contact end of the annular element and the polymeric material of the sealing member is configured to flow between the inner projecting wall and/or the outer projecting wall upon compressive forces of the free contact end, the polymeric material configured to exert an axial and radial force on the free contact end of the annular element when the capsule is positioned in the enclosing member of the beverage preparation device and the enclosing member is closed by the closing member of the beverage preparation device.

11. The capsule according to claim 1, wherein the inner projecting wall and/or outer projecting wall of the annular recess is inclined relative to the annular bottom wall of the annular recess at an angle between 45 and 85 degrees.

12. The capsule according to claim 1, wherein the polymeric material is selected from the group consisting of food grade rubber and thermoplastic elastomer.

13. The capsule according to claim 1, wherein the polymeric material is selected from the group consisting of: silicone rubber, EPDM, polyurethane, styrene TPE, polyester TPE, polyamide TPE, polyolefin, and combinations thereof.

14. The capsule according to claim 1, wherein the polymeric material is a foam, a sponge, or a non-foamed solid.

* * * * *